United States Patent
Harada et al.

(10) Patent No.: US 9,636,823 B2
(45) Date of Patent: May 2, 2017

(54) ROBOT CONTROL DEVICE FOR UPDATING ROTATION ANGLE BY PLURALITY OF ROTATION ANGLE DETECTORS

(71) Applicant: FANUC CORPORATION, Minamitsuru-gun, Yamanashi (JP)

(72) Inventors: Kunihiko Harada, Yamanashi (JP); Takahiro Tanaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/990,115

(22) Filed: Jan. 7, 2016

(65) Prior Publication Data

US 2016/0199982 A1 Jul. 14, 2016

(30) Foreign Application Priority Data

Jan. 8, 2015 (JP) ................... 2015-002640

(51) Int. Cl.
B25J 19/02 (2006.01)
B25J 9/16 (2006.01)

(52) U.S. Cl.
CPC ............. *B25J 9/1664* (2013.01); *B25J 19/02* (2013.01); *G05B 2219/50077* (2013.01); *Y10S 901/02* (2013.01); *Y10S 901/28* (2013.01); *Y10S 901/46* (2013.01)

(58) Field of Classification Search
CPC ...... B25J 9/1653; B25J 9/1694; B25J 13/088; B25J 19/02; G01B 7/30; G05B 19/4067; G05B 2219/50077; G05B 2219/50084; Y10S 901/28; Y10S 901/46; Y10S 901/09
See application file for complete search history.

(56) References Cited

U.S. PATENT DOCUMENTS

| | | | | |
|---|---|---|---|---|
| 4,575,666 A | * | 3/1986 | Nakashima | G01B 7/003 318/602 |
| 4,672,279 A | * | 6/1987 | Hosokawa | B25J 9/12 307/67 |
| 5,075,870 A | * | 12/1991 | Kojyo | G05B 19/4067 700/254 |
| 5,204,603 A | | 4/1993 | Taylor | |
| 2013/0289936 A1 | * | 10/2013 | Houda | G01B 5/24 702/151 |
| 2014/0060233 A1 | | 3/2014 | Gomi et al. | |

FOREIGN PATENT DOCUMENTS

| | | |
|---|---|---|
| CN | 103659798 A | 3/2014 |
| JP | 59-226806 A | 12/1984 |
| JP | H0683452 | 3/1994 |
| JP | H1044076 | 2/1998 |
| JP | 3429414 | 7/2003 |
| JP | 2005140739 | 6/2005 |
| JP | 2007110796 | 4/2007 |
| JP | 2010238174 A | 10/2010 |
| JP | 2012171088 | 9/2012 |
| JP | 2013094452 | 5/2013 |
| JP | 2014065097 | 4/2014 |

* cited by examiner

*Primary Examiner* — Spencer Patton
(74) *Attorney, Agent, or Firm* — RatnerPrestia

(57) ABSTRACT

A robot control device, when starting from a stop state, updates a first rotation angle or a second rotation angle based on at least one of the first rotation angle stored in a first rotation angle storage unit and the second rotation angle stored in a second rotation angle storage unit and at least one of the first rotation angle detected by a first rotation angle detector and the second rotation angle detected by the second rotation angle detector.

4 Claims, 7 Drawing Sheets

ROBOT CONTROL DEVICE FOR UPDATING ROTATION ANGLE BY PLURALITY OF ROTATION ANGLE DETECTORS

BACKGROUND OF THE INVENTION

1. Field of the Invention

The present invention relates to a robot control device for controlling a robot.

2. Description of the Related Art

A position and posture of a robot are preferably controlled in an accurate way so as to be a desired state. It is conventionally known that arm driving devices for driving joint parts and the like are provided with encoders for detecting rotation angles of rotation axes of driving motors to improve accuracy of the positions and postures of robots. It is known that the driving motors of the arm driving devices are controlled based on outputs from the encoders.

As for the encoders for detecting rotation angles of rotation axes, incremental encoders and absolute encoders are known. An absolute encoder can detect an absolute rotation angle with respect to a predetermined reference position. However, the absolute encoder may not be able to detect a rotation angle exceeding a predetermined rotation angle range. For example, when the rotation axis makes one rotation from a position of 1 degree, the rotation angle to be detected is not 361 degrees but 1 degree. Therefore, when the rotation angle exceeding the predetermined rotation angle range is detected, it is preferable that the number of rotations of the rotation axis be stored in another device.

Japanese Laid-open Patent Publication No, 59-226806 discloses an absolute position detector in which two rotation angle detectors are connected to an output shaft of a motor. Rotational speed ratios of these rotation angle detectors are slightly different. It is described that the absolute position detector detects a rotation angle exceeding a detectable range of the rotation angle detectors by a difference between detected angles of the two rotation angle detectors.

Japanese Patent No. 3429414 describes an infinite rotation control method in a robot provided with an infinite rotation control means including a spin encoder. In this patent publication, it is disclosed that the number of rotations N of the output shaft of the driving means and the number of rotations M of the rotation axis is used to set to the rotation ratio N/M, and when the output shaft rotates N rotations, a counted value of the infinite rotation control means increases by M.

The arm driving device is equipped with a reducer to amplify rotational force of the driving motor. Backlashes between gears in the reducer, torsion of the input shaft or the output shaft of the reducer, and the like are factors that deteriorate the accuracy of the position and posture of the robot. Therefore, as a method for highly accurately detecting the rotation angle of the driving shaft of the robot, a second encoder can be mounted on the output shaft of the reducer in addition to a first encoder disposed on the rotation axis of the driving motor. The second encoder can detect the rotation angle of the output shaft of the reducer. Amounts of influence such as the backlash of the reducer are detected based on the output from the second encoder, and control of the driving motor can be corrected.

When the robot control device is in a driving state, the encoder detects the rotation angle, and the rotation angle can be stored in the robot control device. When the robot control device is in a stop state, i.e. in a state that the power source is shut down, the rotation angle of the rotation axis cannot be detected, and the detected rotation angle cannot be stored.

In some cases, the rotation axis is rotated by coasting after the robot control device is stopped, and a position of the output shaft of the reducer is changed for maintenance of the robot when the robot control device is in the stop state. In such cases, the rotation angle of the rotation axis may not be accurately detected after the robot control device is started. In particular, if the stored number of rotations is lost by the stop of the robot control device, the number of rotations may be determined as zero after the robot control device is started.

If the robot control device is stopped, a backup power source for supplying electricity to the encoder during the stop period of the robot control device can be used for enabling the encoder to detect the rotation angle exceeding the predetermined rotation angle range. Since the backup power source supplies electricity to the encoder and the storage device, detection and storage of the rotation angle can be continued during the stop period of the robot control device.

However, when the second encoder is mounted on the output shaft of the reducer, the backup power source of the second encoder is required in addition to the backup power source of the first encoder. Alternatively, when the backup power source includes a storage battery, and a power storage amount of the storage battery becomes zero, information of the rotation angle may be lost.

The device described in the above-described Japanese Laid-open Patent Publication No. 59-226806 can detect the rotation angle exceeding a predetermined range without using the backup power source. However, the rotational speed ratio depends on the robot mechanism in the device, and thus the device cannot be changed to a configuration in which the rotational speed ratio is slightly different. For example, the reducer in which the output shaft makes about one rotation with respect to 100 rotations of the input shaft is often used in the robot. However, there is a problem that a detectable rotation angle cannot be widened. In other words, there is a problem that when the rotational speed ratio cannot be freely set, the detectable rotation angle is significantly limited.

A spin encoder value described in the above-described Japanese Patent No. 3429414 is a virtual encoder calculated by addition of a motor encoder value. The spin encoder value to be finally output does not include a detection result of the rotation angle of the output shaft of the reducer. Therefore, amounts of influence regarding backlashes and torsion and the like of the reducer cannot be detected.

SUMMARY OF INVENTION

A robot control device according to the present invention controls a robot including a joint part driven by an output from a reducer for increasing rotational force of a driving motor. The robot control device includes a first rotation angle detector configured to detect a rotation angle of an input shaft of the reducer and a second rotation angle detector configured to detect a rotation angle of an output shaft of the reducer. The robot control device includes an auxiliary power source configured to supply electricity to the first rotation angle detector in a state in which the robot control device is stopped and a control unit configured to store and update a rotation angle. The control unit includes a first rotation angle storage unit configured to store a first rotation angle detected by the first rotation angle detector and a second rotation angle storage unit configured to store a second rotation angle detected by the second rotation angle detector. The control unit includes a rotation angle updating unit configured to update a rotation angle stored in the first rotation angle storage unit or the second rotation angle storage unit. Supply of electricity to the second rotation angle detector is stopped in the state in which the robot control device is stopped. The second rotation angle storage unit is configured to store the second rotation angle at a time when the robot control device is stopped in the state in which the robot control device is stopped. When the robot control device is started from the state in which the robot control device is stopped, the rotation angle updating unit updates the first rotation angle or the second rotation angle based on at least one of the first rotation angle stored in the first rotation angle storage unit and the second rotation angle stored in the second rotation angle storage unit and at least one of the first rotation angle detected by the first rotation angle detector and the second rotation angle detected by the second rotation angle detector.

According to the above-described invention, the rotation angle updating unit is able to calculate an error in the number of rotations regarding the second rotation angle based on a difference between the first rotation angle when the robot control device is stopped and the first rotation angle detected by the first rotation angle detector when the robot control device is started and a difference between the second rotation angle when the robot control device is stopped and the second rotation angle detected by the second rotation angle detector when the robot control device is started and updates the second rotation angle based on the error in the number of rotations.

According to the above-described invention, when the robot control device is started from the state in which the robot control device is stopped, the rotation angle updating unit is able to calculate the number of rotations regarding the first rotation angle at which the first rotation angle is closest to the second rotation angle based on a difference between the second rotation angle stored in the second rotation angle storage unit or the second rotation angle detected by the second rotation angle detector after the robot control device is started and the first rotation angle detected by the first rotation angle detector after the robot control device is started, and updates the first rotation angle based on the calculated number of rotations.

According to the above-described invention, the control unit includes an update judgement unit configured to judge whether the second rotation angle stored in the second rotation angle storage unit needs to be updated, and the update judgement unit is able to detect a difference between the first rotation angle and the second rotation angle during a period in which the robot is driven and prohibit update of the second rotation angle when the difference between the first rotation angle and the second rotation angle exceeds a predetermined judgement value.

According to the above-described invention, the control unit includes an abnormality detection unit configured to detect an abnormality in the first rotation angle detector and an update judgement unit configured to judge whether the second rotation angle stored in the second rotation angle storage unit needs to be updated, and the update judgement unit is able to prohibit update of the second rotation angle when an abnormality is detected in the first rotation angle detector and determine to update the first rotation angle when the first rotation angle detector is recovered from the abnormality.

DETAILED DESCRIPTION

A robot control device according to an embodiment is described with reference to FIG. 1 to FIG. 8. The robot control device according to the present embodiment includes a control unit for outputting a command to a robot and a detector such as a sensor mounted on the robot.

Figure 1:
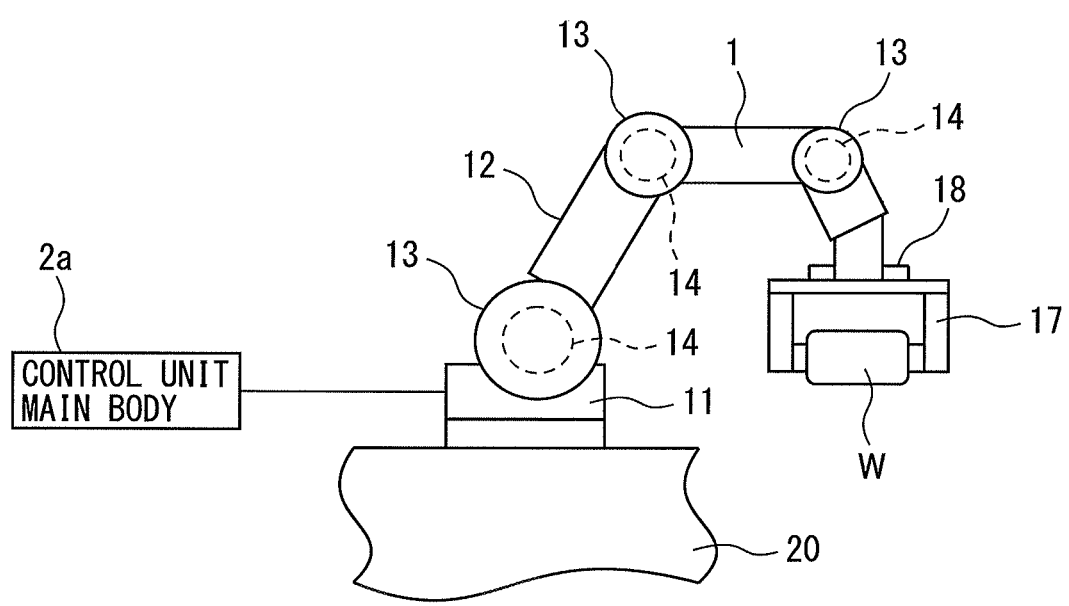
FIG. 1 is a schematic view of a robot system according to an embodiment.

FIG. 1 is a schematic view of the robot system according to the present embodiment. The robot system comprises a hand 17 for holding a workpiece W, a robot 1 for moving the hand 17, and a control unit main body 2a for outputting an operation command to the robot 1. The robot 1 of the present embodiment is an articulated robot. The hand 17 holds and releases the workpiece W. An arm 12 moves the hand 17 while supporting the hand 17. The arm 12 is supported by a base unit 11. The base unit 11 is fixed to an installation surface 20.

The arm 12 of the present embodiment includes a plurality of joint parts 13. The robot 1 includes an arm driving device for driving each of the joint parts 13. The arm driving device includes driving motors 14 disposed in the joint parts 13. The driving motor 14 is driven, and accordingly the arm 12 can be bent at the joint parts 13 at desired angles. The robot of the present embodiment is formed so as to be able to rotate the entire arm 12 using the vertical direction as the rotation axis. The arm driving device includes a driving motor for rotating the entire arm 12.

The robot 1 includes a hand driving device for closing and opening the hand 17. The hand driving device of the present embodiment drives the hand 17 by air pressure. The hand driving device includes a hand driving cylinder 18 connected to the hand 17, an air pump and a solenoid valve for supplying compressed air to the hand driving cylinder 18.

Figure 2:
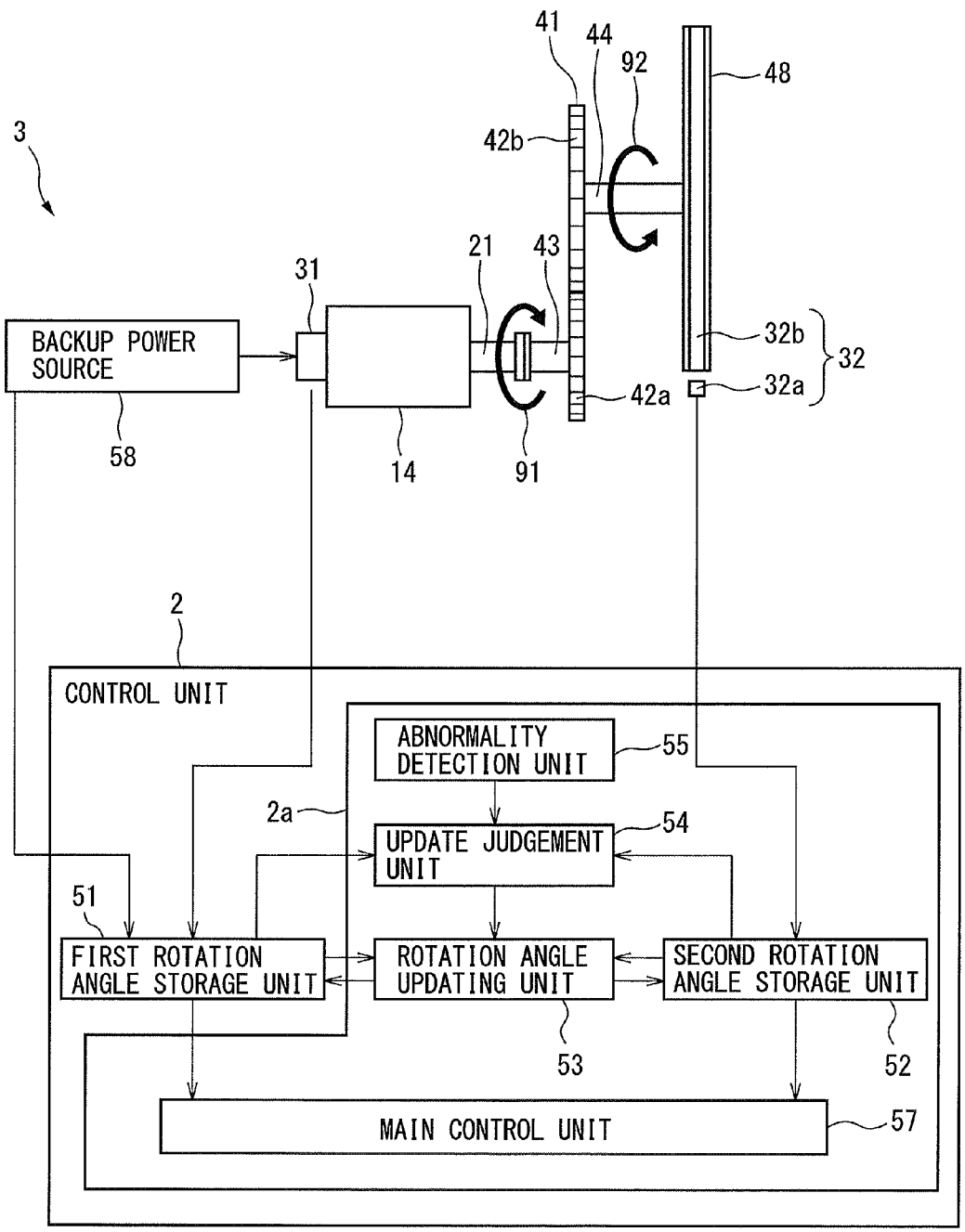
FIG. 2 is a schematic view of a robot control device and an arm driving device according to the embodiment.

FIG. 2 is a schematic view of the robot control device and the arm driving device according to the present embodiment. A control unit 2 includes the control unit main body 2a. The control unit main body 2a includes a digital computer including a CPU (Central Processing Unit), a RAM (Random Access Memory), a ROM (Read Only Memory), and the like which are connected with each other via a bus. The arm driving device and the hand driving device are controlled by the control unit 2. The rotation angle of the driving motor 14 and the air pressure of the hand driving cylinder 18 are controlled by the control unit 2.

To the control unit 2, for example, an operation program for operating of the robot 1 is input. A main control unit 57 of the control unit 2 outputs an operation command to drive the robot 1 based on the operation program and the like. The operation command is output to the arm driving device, the hand driving device, and the like.

FIG. 2 illustrates the arm driving device for driving one of the joint parts 13. The arm driving device includes a reducer 41 for increasing rotational force of the driving motor 14. According to the present embodiment, the driving motor 14 and the reducer 41 are disposed in the joint part 13. The reducer 41 includes an input shaft 43, a plurality of gears 42a and 42b, and an output shaft 44. The input shaft 43 is coupled to a rotating shaft 21 of the driving motor 14. The output shaft 44 of the reducer 41 is coupled to a link member 48 as a power transmission member for driving the joint parts 13.

When the rotating shaft 21 of the driving motor 14 is rotated as indicated by an arrow 91, the rotational force is transmitted to the output shaft 44 via the input shaft 43 and the gears 42a and 42b of the reducer 41. Then, the output shaft 44 of the reducer 41 rotates the link member 48 as indicated by an arrow 92.

The robot control device 3 includes a plurality of rotation angle detectors. The robot control device 3 includes a first encoder 31 as a first rotation angle detector for detecting the rotation angle of the input shaft 43 of the reducer 41. According to the present embodiment, the rotation angle detected by the first encoder 31 is referred to as a first rotation angle. The first encoder 31 is connected to the rotating shaft 21 of the driving motor 14. The robot control device 3 includes a second encoder 32 as a second rotation angle detector for detecting the rotation angle of the output shaft 44 of the reducer 41. According to the present embodiment, the rotation angle detected by the second encoder 32 is referred to as a second rotation angle.

The first encoder 31 and the second encoder 32 of the present embodiment are absolute encoders. The absolute encoder detects not a relative rotation angle but an absolute rotation angle with respect to a predetermined reference position. The absolute encoder can detect a rotation angle within a predetermined range. For the first rotation angle detector and the second rotation angle detector, arbitrary devices which can detect a rotation angle of each rotation axis can be adopted.

Figure 3:
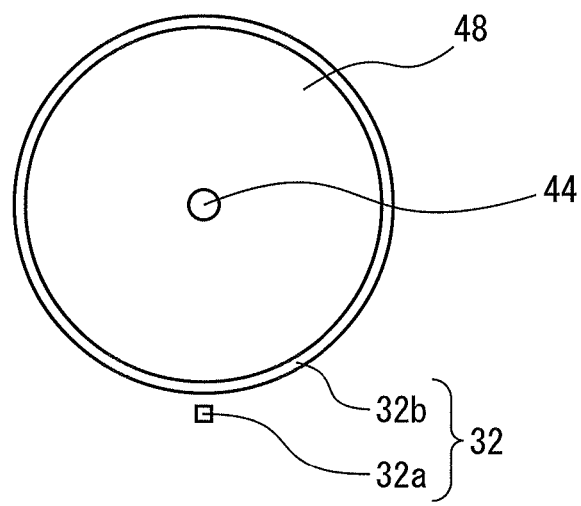
FIG. 3 is a schematic view which illustrates a second encoder according to the embodiment.

FIG. 3 is a schematic front view of the second encoder and the link member according to the present embodiment. The link member 48 is formed in a disk shape. The second encoder 32 includes a scale 32b disposed on an end surface extending in a circumferential direction of the link member 48 and a detection element 32a for reading scale marks on the scale 32b. On the surface of the scale 32b, the scale marks are graduated in angles obtained by dividing 360 degrees by resolution of the second encoder 32. The detection element 32a is closely disposed to the scale 32b so as to face the scale 32b. The first encoder 31 also has the configuration similar to that of the second encoder 32.

Figure 4:
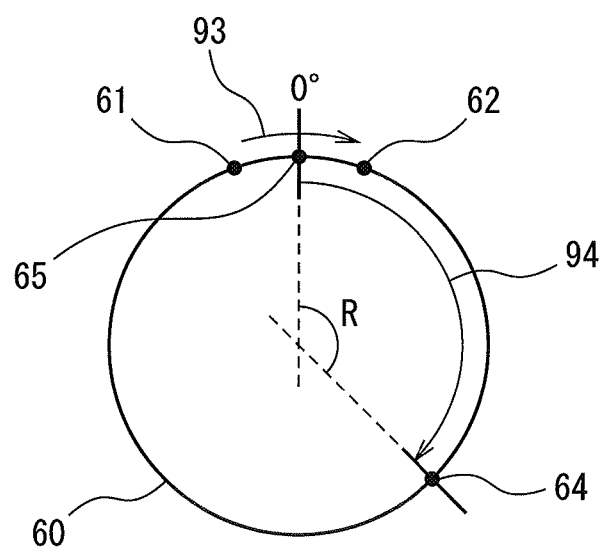
FIG. 4 is a diagram which illustrates a rotation angle detected by an encoder.

FIG. 4 is a schematic view of a rotation angle detected by the encoder of the present embodiment. FIG. 4 illustrates a rotation axis 60 corresponding to the input shaft 43 and the output shaft 44 of the reducer 41. To the rotation axis 60, a reference point 65 to be a reference position is set. The reference point 65 corresponds to, for example, a rotation angle of 0 degrees. As indicated by an arrow 94, when the rotation axis 60 is rotated, a moving point 64 moves with respect to the reference point 65. An angle between a line connecting the reference point 65 and the rotation center and a line connecting the moving point 64 and the rotation center is a rotation angle R. According to the present invention, a rotation angle within a range of one rotation of the rotation axis 60, i.e. the rotation angle of 0 degrees or more and less than 360 degrees is referred to as "the rotation angle in one rotation". The encoder according to the present embodiment can detect an arbitrary angle as the rotation angle R in one rotation within a range from 0 degrees or more and less than 360 degrees. In other words, the measurement range of the first encoder 31 and the second encoder 32 for one rotation is 0 degrees or more and less than 360 degrees.

When the rotation angle is 360 degrees or more, or less than 0 degrees, the number of rotations of the rotation axis 60 is stored in the storage device. By this control, the rotation angle can be detected without upper limit and lower limit of the rotation angle. For example, when the number of rotations is two rotations (720 degrees), and the rotation angle in one rotation is 90 degrees, the rotation angle is 810 degrees.

With reference to FIG. 2, the control unit 2 of the present embodiment includes a first rotation angle storage unit 51 for storing information regarding the first rotation angle detected by the first encoder 31. The first rotation angle storage unit 51 stores the rotation angle in one rotation and the number of rotations of the input shaft 43. The first rotation angle storage unit 51 of the present embodiment is a built-in memory installed in the main body of the first encoder 31. The control unit 2 includes a second rotation angle storage unit 52 for storing information regarding the second rotation angle detected by the second encoder 32. The second rotation angle storage unit 52 of the present embodiment stores the rotation angle in one rotation and the number of rotations of the output shaft 44. The second rotation angle storage unit 52 is disposed on the control unit main body 2a.

With reference to FIG. 4, when the rotation angle is 360 degrees or more, or less than 0 degrees, the encoder detects that the rotation angle exceeds the reference point 65 of 0 degrees. When the rotation angle is 360 degrees or more, the number of rotations is incremented by one. When the rotation angle is less than 0 degrees, the number of rotations is decremented by one. The encoder can detect the rotation angle at arbitrary time based on the number of rotations stored in the storage units and the rotation angle in one rotation detected by the encoder. Calculation of the rotation angle can be performed by the respective encoders or the control unit main body 2a.

With reference to FIG. 2, the main control unit 57 can calculate an error in the rotation angle caused by the backlash of the reducer 41, the torsion of the input shaft 43 or the output shaft 44 of the reducer 41, and the like based on a difference between the first rotation angle and the second rotation angle. Thus, the main control unit 57 can control the driving motor 14 so as to cancel the calculated error. Control to correct an operation command of the driving motor 14 can be performed using an output of the second encoder 32. Accordingly, errors in the position and posture of the robot can be reduced. For example, a position of a distal end point of the robot 1 can be accurately controlled.

When the robot control device 3 is stopped, continuous supply of electricity from the outside is stopped. The robot control device 3 according to the present embodiment includes a backup power source 58 for supplying electricity to the first encoder 31 and the first rotation angle storage unit 51 even in a state in which the robot control device 3 is stopped, i.e. a state in which a main power source of the robot control device is shut down. The backup power source 58 functions as an auxiliary power source. When the robot control device 3 is stopped, electricity to be supplied to the control unit main body 2a and the detectors, such as the encoders, is shut down. On the other hand, electricity is supplied to the first encoder 31 and the first rotation angle storage unit 51 from the backup power source 58 during a period in which the robot control device 3 is stopped, so that the first rotation angle of the input shaft 43 of the reducer 41 can be continuously detected.

In particular, the built-in memory functioning as the first rotation angle storage unit 51 of the present embodiment is a volatile memory which loses stored information when supply of electricity is stopped. However, the first rotation angle storage unit 51 is connected to the backup power source 58, and accordingly when the robot control device 3 is in the stop state, the first rotation angle can be stored.

On the other hand, the second rotation angle storage unit 52 is a nonvolatile memory which stores the rotation angle when the supply of electricity is stopped. The second rotation angle storage unit 52 is not connected to the backup power source, however, the second rotation angle storage unit 52 can store the second rotation angle when the robot control device 3 is in the stop state. However, when the robot control device 3 is stopped, detection of the second rotation angle by the second encoder 32 is stopped.

In the meantime, the output shaft 44 is rotated during the stop period of the robot control device 3 in some cases. For example, the output shaft 44 may be rotated by coasting when the power source of the robot control device 3 is shut down. Alternatively, the output shaft 44 may be moved for maintenance and inspection of the robot 1. FIG. 4 depicts a moving point 61 when the robot control device 3 is stopped and a moving point 62 when the robot control device 3 is started. There is a case that the rotation axis 60 is rotated and the moving point passes through the reference point 65 as indicated by an arrow 93 during the stop period of the robot control device 3. In this case, the number of rotations is incremented by one but not changed since the second encoder 32 is stopped. When the robot control device 3 is started, the second rotation angle is detected based on the number of rotations at the time of stop. Therefore, the second rotation angle may be erroneously detected when the robot control device 3 is started.

In the first control of the robot system 3 according to the present embodiment, the control is performed to update the second rotation angle detected by the second encoder 32 with a correct value when the robot control device 3 is started.

With reference to FIG. 2, the control unit 2 includes a rotation angle updating unit 53 for updating the first rotation angle stored in the first rotation angle storage unit 51 and the second rotation angle stored in the second rotation angle storage unit 52. The rotation angle updating unit 53 has a function of reading the first rotation angle stored in the first rotation angle storage unit 51 and a function of updating the first rotation angle stored in the first rotation angle storage unit 51 with a new value. Similarly, the rotation angle updating unit 53 has a function of reading the second rotation angle stored in the second rotation angle storage unit 52 and a function of updating the second rotation angle stored in the second rotation angle storage unit 52 with a new value.

As described below, the control unit 2 includes an update judgement unit 54 for judging whether at least one of the first rotation angle and the second rotation angle is necessary to be updated and an abnormality detection unit 55 for detecting an abnormality in the first encoder 31 or the second encoder 32.

Figure 5:
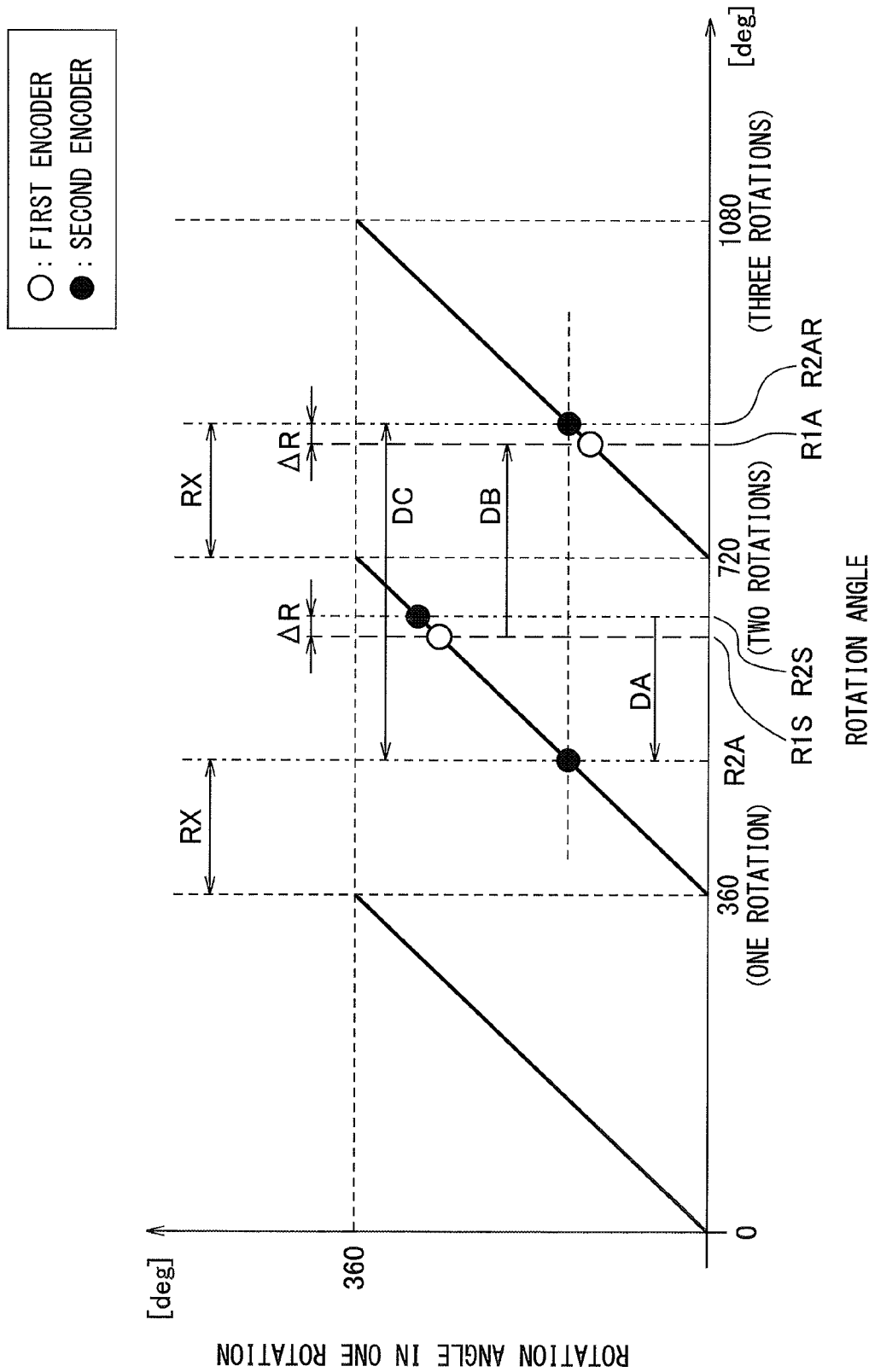
FIG. 5 is a graph illustrating first control for updating a second rotation angle.

FIG. 5 is a graph illustrating the first control for updating the second rotation angle. The abscissa represents the first rotation angle output by the first encoder 31 and the second rotation angle detected by the second encoder 32. In other words, the abscissa represents the first rotation angle of the input shaft 43 and the second rotation angle of the output shaft 44 of the reducer 41. The ordinate represents the rotation angle in one rotation of each rotation axis. A range of the ordinate is 0 degrees or more and less than 360 degrees. The rotation angle of the abscissa can be increased or decreased infinitely.

In this example, when the robot control device 3 is stopped, the first rotation angle R1S is detected by the first encoder 31, and the second rotation angle R2S is detected by the second encoder 32. The first rotation angle R1S and the second rotation angle R2S are close to each other. A slight difference ΔR between the first rotation angle R1S and the second rotation angle R2S corresponds an error caused by the backlash of the reducer 41 and the like. Thus, the reducer 41 is driven to a direction to increase the rotation angle by coasting of the arm driving device and the like after the robot control device 3 is stopped.

When the reducer 41 is driven, the rotation angle is moved from the first rotation angle R1S to the first rotation angle R1A. On this occasion, the first rotation angle crosses the reference point at 720 degrees (360 degrees×n). In this example, the number of rotations increases from one rotation to two rotations. Since the first encoder 31 is supplied with electricity during the stop period of the robot control device 3, the first encoder 31 can correctly detect the first rotation angle R1A when the robot control device 3 is started.

The difference ΔR between the first rotation angle R1S and the second rotation angle R2S is maintained at approximately constant when the reducer 41 is driven. The correct value to be detected by the second encoder 32 is the second rotation angle R2AR. However, during the stop period of the robot control device 3, the number of rotations stored in the second rotation angle storage unit 52 is maintained at one rotation without being changed. Thus, the value detected by the second encoder 32 when the robot control device 3 is started will be the second rotation angle R2A. An angle difference RX from 720 degrees to the second rotation angle R2AR is approximately the same with an angle difference RX from 360 degrees to the second rotation angle R2A.

Figure 6:
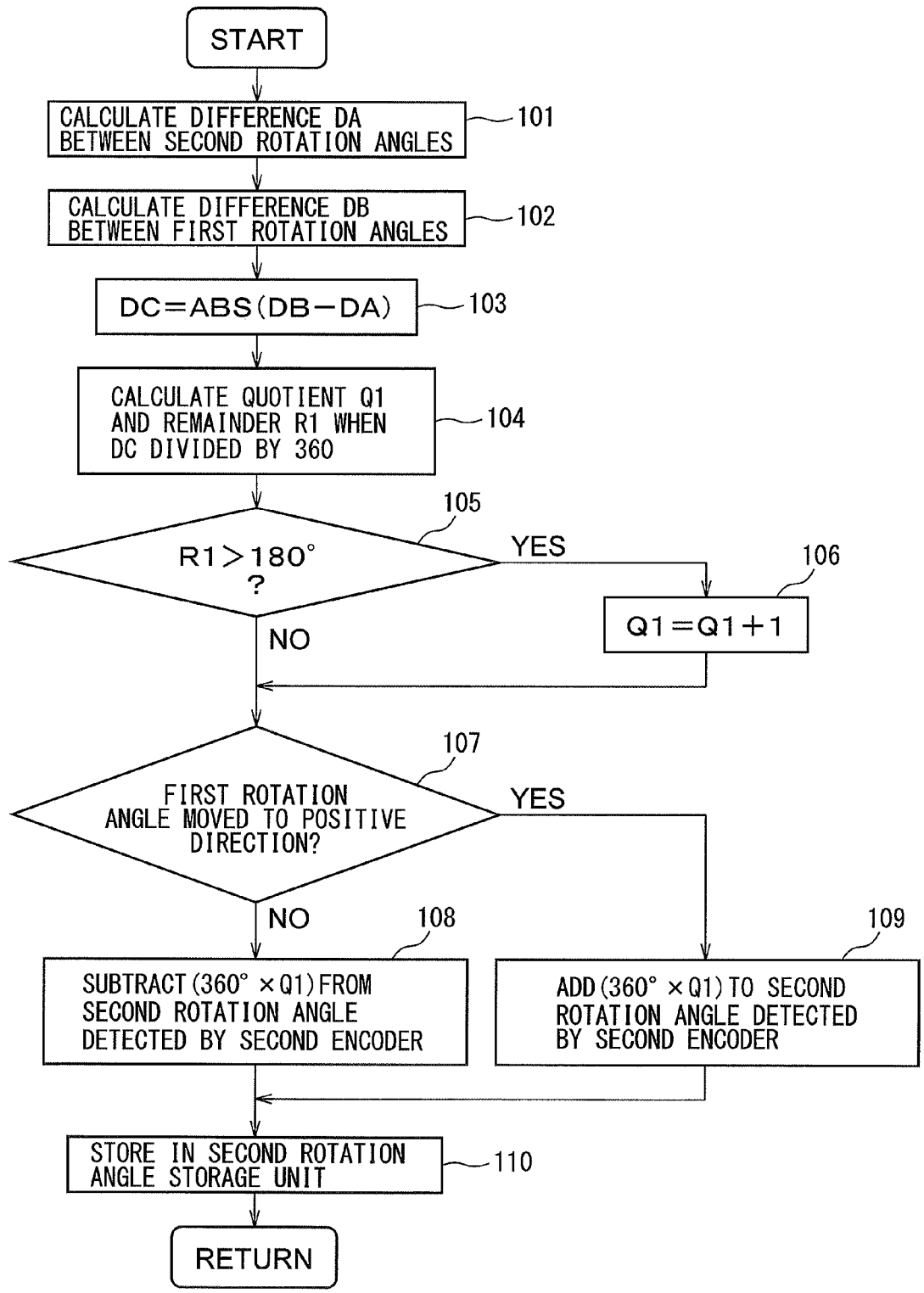
FIG. 6 is a flowchart of the first control for updating the second rotation angle.

FIG. 6 is a flowchart illustrating the first control for updating the second rotation angle. With reference to FIG. 5 and FIG. 6, the first control can be performed when the robot control device 3 is started from the stop state. In addition, the first control can be performed by the rotation angle updating unit 53 in FIG. 2. This control is suitable if there is a change between the second rotation angle when the robot control device 3 is stopped and the second rotation angle when the robot control device 3 is started.

The first rotation angle R1S when the robot control device 3 is stopped is stored in the first rotation angle storage unit 51. The second rotation angle R2S when the robot control device 3 is stopped is also stored in the second rotation angle storage unit 52.

In step 101, a difference DA between the second rotation angles at the time of stop and after the startup is calculated. The difference DA is calculated by subtracting the rotation angle R2S when the robot control device 3 is stopped from the second rotation angle R2A detected based on the number of rotations stored in the second rotation angle storage unit 52 when the robot control device 3 is started.

$$DA = R2A - R2S \qquad (1)$$

Next, in step 102, a difference DB between the first rotation angles at the time of stop and after the startup is calculated. The difference DB is calculated by subtracting the first rotation angle R1S when the robot control device 3 is stopped from the first rotation angle R1A detected by the first encoder 31 when the robot control device 3 is started.

$$DB = R1A - R1S \quad (2)$$

Next, in step 103, a difference DC of the rotation angles in FIG. 5 is calculated. The difference DC of the rotation angles corresponds to a difference between the correct second rotation angle R2AR to be normally detected by the second encoder 32 and the second rotation angle R2A actually detected by the second encoder 32 at the time of the startup. The difference DC can be calculated based on a difference between the above-described difference DA regarding the second rotation angles and the difference DB regarding the first rotation angles.

$$DC = ABS(DB - DA) \quad (3)$$

As described above, the difference ΔR between the first rotation angle and the second rotation angle is maintained at approximately constant after the robot control device is stopped. Thus, the difference DC can be accurately calculated by adding a size of the difference DB and a size of the difference DA. The difference DC corresponds to a difference in the number of rotations. Thus, the difference DC is ideally multiples of 360 degrees. However, the difference DC may not be multiples of 360 degrees with accuracy by a measurement error and the like. Thus, in the control according to the present embodiment, an error in the number of rotations is estimated.

In step 104, a quotient Q1 and a remainder R1 are calculated by dividing the difference DC regarding the second rotation angles by 360. In step 105, it is judged whether the remainder R1 is more than a judgement value. According to the present embodiment, 180 degrees, i.e. a half of 360 degrees is adopted as the judgement value. When the remainder R1 is more than 180 degrees, the processing proceeds to step 106. In this case, the remainder R1 is less than 360 degrees and also a value close to 360 degrees. In step 106, one is added to the quotient Q1, and the processing proceeds to step 107.

In step 105, when the remainder R1 is equal to or less than 180 degrees, the processing proceeds to step 107. In this case, the remainder R1 is a value more than and close to zero. The quotient Q1 calculated in step 105 and step 106 corresponds to the error in the number of rotations of the second rotation angle. In other words, the error in the number of rotations regarding the second rotation angle at which the second rotation angle is closest to the first rotation angle. For the judgement value, a value more or less than 180 degrees can be used. For the judgement value, any value can be used as long as the value takes account of the measurement error and the like.

In step 107, it is judged whether the first rotation angle R1A at the time of the startup is moved to the positive direction compared to the first rotation angle R1S at the time of stop. In other words, the rotation direction of the reducer during the stop period is determined. In the example illustrated in FIG. 5, it can be determined that the first rotation angle is moved to the positive direction.

In step 107, when the first rotation angle is moved to the positive direction, the processing proceeds to step 109. In step 109, (360 degrees×Q1) is added to the second rotation angle R2A detected by the second encoder 32 at the time of the startup. In other words, the rotation angle corresponding to the calculated error in the number of rotations is added. Alternatively, when the number of rotations is stored in the second rotation angle storage unit 52, the calculated quotient Q1 may be added to the stored number of rotations. Subsequently, the processing proceeds to step 110.

In step 107, when the first rotation angle is not moved to the positive direction, the first rotation angle is moved in the negative direction. In this case, in step 108, (360 degrees×Q1) is subtracted from the second rotation angle detected by the second encoder at the time of the startup. In other words, the rotation angle corresponding to the calculated error in the number of rotations is subtracted. Alternatively, when the number of rotations is stored in the second rotation angle storage unit 52, the calculated quotient Q1 may be subtracted from the stored number of rotations. Subsequently, the processing proceeds to step 110.

In step 110, the second rotation angle R2AR calculated in step 108 or step 109 is stored in the second rotation angle storage unit 52. The second rotation angle R2A detected at the time of the startup is replaced with the second rotation angle R2AR. As described above, the second rotation angle can be updated.

When the robot control device 3 is started from the stop state, the rotation angle updating unit 53 of the present embodiment updates the first rotation angle or the second rotation angle based on at least one of the first rotation angle stored in the first rotation angle storage unit 51 and the second rotation angle stored in the second rotation angle storage unit 52 and at least one of the first rotation angle detected by the first encoder 31 and the second rotation angle detected by the second encoder 32. By this control, if there is no backup power source to be connected to the second encoder 32, the rotation angle of at least one of the first rotation angle and the second rotation angle is updated after the robot control device is started. In particular, the number of rotations of the rotation angle can be updated.

In the first control, the rotation angle updating unit 53 updates the second rotation angle based on the first rotation angle and the second rotation angle detected when the robot control device 3 is stopped and the first rotation angle and the second rotation angle detected when the robot control device 3 is started from the stop state.

Further, the rotation angle updating unit 53 calculates a difference between the first rotation angle when the robot control device 3 is stopped and the first rotation angle detected by the first encoder 31 when the robot control device 3 is started. The rotation angle updating unit 53 calculates a difference between the second rotation angle when the robot control device 3 is stopped and the second rotation angle detected by the second encoder 32 when the robot control device 3 is started. The rotation angle updating unit 53 calculates the error in the number of rotations regarding the second rotation angle based on these differences and updates the second rotation angle stored in the second rotation angle storage unit based on the calculated number of rotations.

By performing the first control of the present embodiment, the number of rotations of the second rotation angle can be updated so that the second rotation angle is brought closest to the first rotation angle when the robot control device 3 is started. The second rotation angle detected by the second encoder can be updated with a corrected value. Accordingly, the control of the position and posture of the robot can be accurately performed. Alternatively, if the relative relationship of the second rotation angle detected by the second encoder 32 to the first rotation angle detected by the first encoder 31 is lost by an erroneous operation and the like, the second rotation angle can be accurately set again.

With reference to FIG. 2, when the second encoder 32 and the second rotation angle storage unit 52 are connected to the backup power source, the second rotation angle can be accurately detected during the stop period of the robot control device 3. In other words, when the robot control device 3 is started, the second rotation angle can be accurately detected. However, by performing the first control of the present embodiment, the second rotation angle can be updated when the robot control device 3 is started without the backup power source for supplying electricity to the second encoder 32 and the second rotation angle storage unit 52.

The control unit 2 of the present embodiment includes the update judgement unit 54 for judging whether the second rotation angle stored in the second rotation angle storage unit 52 needs to be updated. When detecting that the robot control device 3 is started from the stop state, the update judgement unit 54 can output a command to update the second rotation angle to the rotation angle updating unit 53.

With reference to FIG. 5, the difference ΔR between the first rotation angle and the second rotation angle is maintained at approximately constant during a period in which the robot is driven. However, the difference ΔR becomes large by breakdowns of the arm driving device, the encoder, and the like in some cases. The update judgement unit 54 of the present embodiment detects the difference ΔR between the first rotation angle and the second rotation angle during the period in which the robot is driven. The update judgement unit 54 then performs control to prohibit the update of the second rotation angle when the difference ΔR exceeds a predetermined judgement value. For the judgement value, a small value, for example, about 1 degree can be adopted.

For example, when an abnormality occurs in the arm driving device and the like, the difference ΔR may become large. If the second rotation angle is updated in such a state, accurate update cannot be performed. Therefore, the update judgement unit 54 performs the control to prohibit the update of the second rotation angle. By this control, unnecessary update of the second rotation angle can be excluded.

Next, second control according to the present embodiment is described. With reference to FIG. 2, when the backup power source 58 includes the storage battery, the electric capacity of the storage battery may become zero during the stop period of the robot control device 3. In this case, information regarding the first rotation angle stored in the first rotation angle storage unit 51 is lost. In addition, the information regarding the first rotation angle stored in the first rotation angle storage unit 51 may be lost when the first encoder 31 is repaired and the like.

In the second control of the present embodiment, the first rotation angle stored in the first rotation angle storage unit 51 is updated based on the second rotation angle stored in the second rotation angle storage unit 52. The second control is suitable when the reducer 41 is not driven by coasting and the like during the stop period of the robot control device 3.

Figure 7:
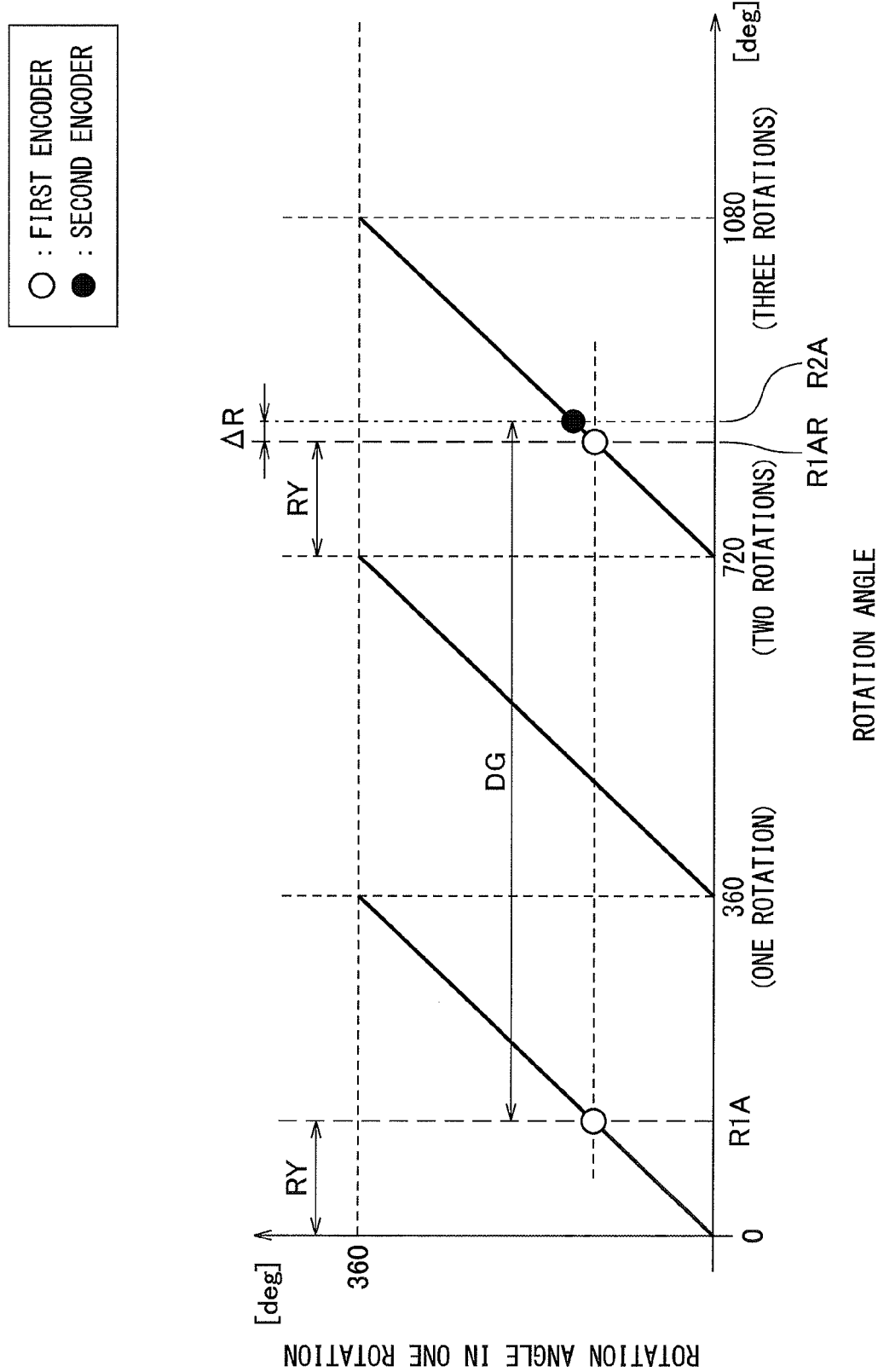
FIG. 7 is a graph illustrating second control for updating a first rotation angle.

FIG. 7 is a graph illustrating the second control of the present embodiment. In the example in FIG. 7, when the robot control device 3 is stopped, the second rotation angle R2A detected by the second encoder 32 is stored in the second rotation angle storage unit 52. In addition, the first rotation angle R1AR detected by the first encoder 31 is stored in the first rotation angle storage unit 51.

With reference to FIG. 2 and FIG. 7, the first rotation angle and the second rotation angle are maintained at constant during the stop period of the robot control device 3. When the electric capacity of the storage battery in the backup power source 58 becomes zero during the stop period, information of the first rotation angle stored in the first rotation angle storage unit 51 is lost. If the robot control device 3 is started again after the storage battery is charged from such a state, the information regarding the number of rotations is lost among the information pieces of the first rotation angle. In other words, the number of rotations of the first rotation angle is zero rotations. The first encoder 31 detects the rotation angle in one rotation and detects the first rotation angle R1A. An angle difference RY between 0 degrees and the first rotation angle R1A becomes equal to an angle difference RY between 720 degrees and the first rotation angle R1AR.

On the other hand, the information regarding the second rotation angle R2A is stored in the second rotation angle storage unit 52, and thus the correct number of rotations and the correct rotation angle in one rotation are stored without being lost. Therefore, when the robot control device 3 is started, the second encoder 32 outputs the second rotation angle R2A identical to that of when the robot control device 3 is stopped. In this state, the second control for updating the first rotation angle is performed.

Figure 8:
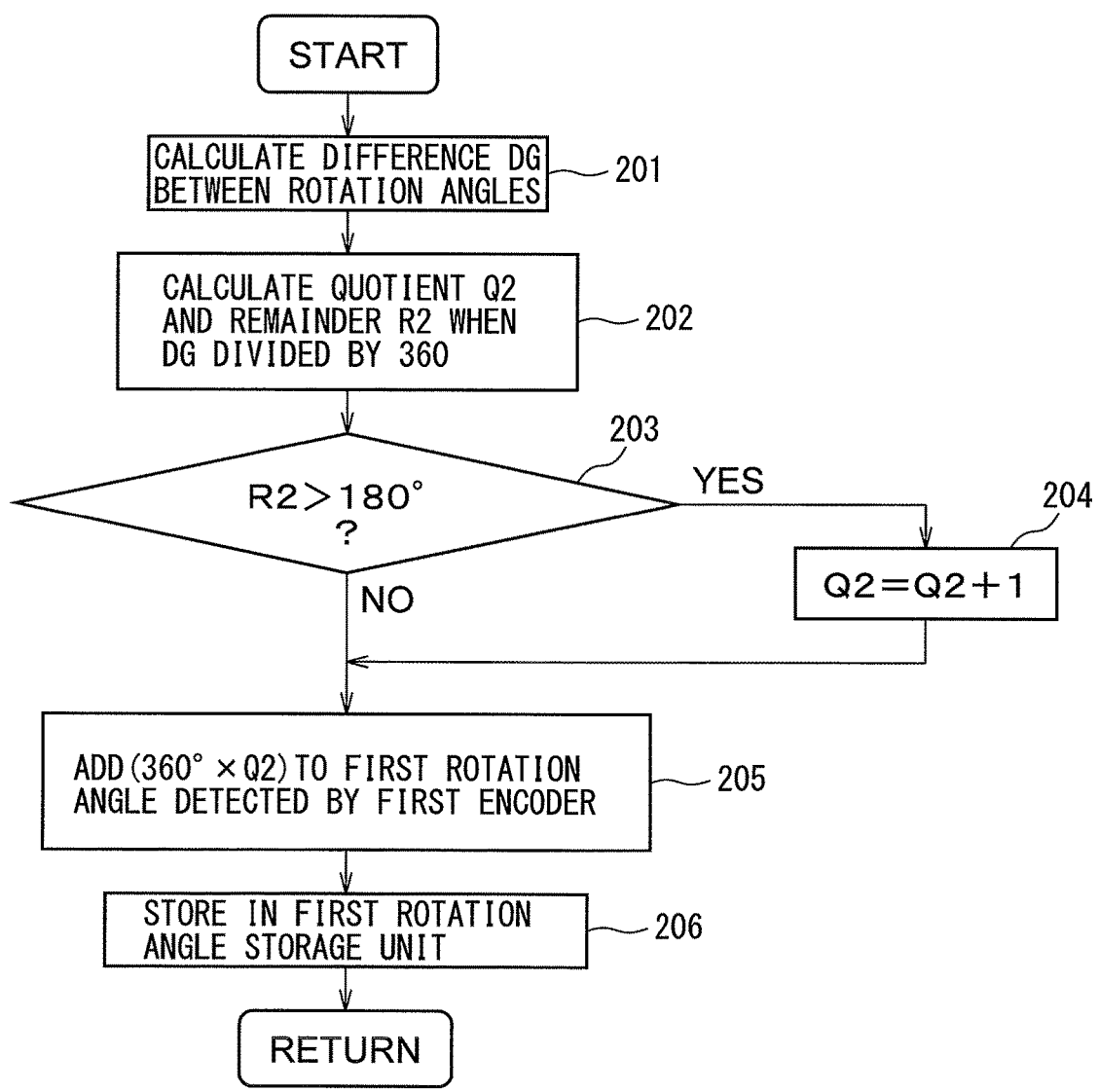
FIG. 8 is a flowchart of the second control for updating the first rotation angle.

FIG. 8 is a flowchart of the second control for updating the first rotation angle according to the present embodiment. The control illustrated in FIG. 8 can be performed, for example, when the robot control device 3 is started from the stop state.

With reference to FIG. 7 and FIG. 8, in step 201, a difference DG of the rotation angles is calculated. The difference DG of the rotation angles is a difference between the second rotation angle R2A stored in the second rotation angle storage unit 52 and the first rotation angle R1A of which the number of rotations detected by the first encoder 31 after the startup is zero. The difference DG is calculated by subtracting the first rotation angle R1A from the second rotation angle R2A. The second rotation angle detected by the second encoder 32 after the robot control device 3 is started may be used instead of the second rotation angle stored in the second rotation angle storage unit 52.

$$DG = R2A - R1A \quad (4)$$

The difference ΔR between the first rotation angle and the second rotation angle is very small, and thus it can be considered that the difference DG of the rotation angles is a value close to the integer multiple of 360. Since the information of the number of rotations regarding the first rotation angle is lost, the number of rotations regarding the first rotation angle is set. The next control to calculate an error in the number of rotations is similar to the first control.

In step 202, a quotient Q2 and a remainder R2 are calculated by dividing the difference DG of the rotation angles by 360.

Next, in step 203, it is judged whether the remainder R2 is more than 180 degrees as a judgement value. When the remainder R2 is more than 180 degrees, the remainder R2 is less than 360 degrees and also a value close to 360 degrees. In this case, the processing proceeds to step 204, and one is added to the quotient Q2. Subsequently, the processing proceeds to step 205.

In step 203, when the remainder R2 is equal to or less than 180 degrees, the processing proceeds to step 205 without changing the quotient Q2. In this case, the remainder R2 is approximately zero. For the judgement value in step 203, 180 degrees is used as with the first control, however the judgement value may be more or less than 180 degrees without being limited to the above-described embodiment. For the judgement value, any value can be used as long as the value takes account of the measurement error and the like.

Next, in step 205, the first rotation angle is calculated by adding (360 degrees×Q2) to the first rotation angle R1A detected by the first encoder 31. In step 206, the calculated first rotation angle R1AR is stored in the first rotation angle storage unit 51.

In the second control, when the robot control device is started from the stop state, the rotation angle updating unit 53 updates the first rotation angle stored in the first rotation angle storage unit 51 based on the second rotation angle stored in the second rotation angle storage unit 52 or the second rotation angle detected by the second encoder 32 after the startup and the first rotation angle detected by the first encoder 31 after the startup. In particular, in the second control, the number of rotations regarding the first rotation angle at which the first rotation angle is closest to the second rotation angle is calculated based on a difference between the second rotation angle stored in the second rotation angle storage unit and the first rotation angle detected by the first rotation angle detector, and the first rotation angle is updated based on the calculated number of rotations.

By performing the second control, when the information regarding the first rotation angle stored in the first rotation angle storage unit 51 is lost by malfunction of the backup power source 58 and the like, the first rotation angle detected by the first encoder 31 can be correctly set again. In particular, the number of rotations of the first rotation angle can be correctly updated. Further, if mastering data of the first rotation angle storage unit 51 is lost, the mastering data can be restored based on the information regarding the second rotation angle stored in the second rotation angle storage unit 52.

The second control of the present embodiment can be applied not only to the control performed after the backup power source 58 is recovered and, when the information regarding the first rotation angle is lost in an arbitrary state, update the information regarding the first rotation angle based on the information of the second rotation angle stored in the second rotation angle storage unit 52. For example, when the first encoder 31 is recovered from occurrence of abnormality, the information of the first rotation angle can be restored from the information of the second rotation angle stored in the second rotation angle storage unit.

The control unit 2 of the present embodiment includes the abnormality detection unit 55 for detecting an abnormality in the first encoder 31 and the second encoder 32. The update judgement unit 54 can prohibit the update of the second rotation angle when the abnormality detection unit 55 detects the abnormality in the first encoder 31. Further, the update judgement unit 54 can determine to update the first rotation angle when the abnormality detection unit 55 detects that the first rotation angle detector is recovered from the abnormality.

For example, the abnormality detection unit 55 detects disconnection of a cable supplying electricity to the first encoder 31 and prohibits the first control. Further, the update judgement unit 54 can detect that the cable is repaired and normally energized and determine that the first rotation angle needs to be updated. The update judgement unit 54 outputs a command to update the first rotation angle to the rotation angle updating unit 53. By this control, unnecessary update of the second rotation angle can be excluded. In addition, the first rotation angle can be updated with a correct value after the recovery.

According to the present embodiment, the articulated robot is described as an example, however, the present invention can be applied to arbitrary robot control devices without limiting to the above-described embodiment.

The robot control device of the present invention is the robot control device including the rotation angle detector for detecting the rotation angle of the input shaft of the reducer and the rotation angle detector for detecting the rotation angle of the output shaft of the reducer and can update at least one of the rotation angles after the robot control device is started.

According to each of the above-described control, the order of steps can be appropriately changed within a range not changing functions and operations. The above-described embodiments can be appropriately combined with each other. In the above-described drawings, portions similar to or corresponds to one another are denoted by the same reference numerals. It is to be noted that the above-described embodiments are merely examples and not intended to limit the scope of the present invention. Further, the above-described embodiments include modifications of the embodiments falling within the scope of the present invention.

The invention claimed is:

1. A robot control device for controlling a robot including a joint part driven by an output from a reducer for increasing rotational force of a driving motor, the robot control device comprising:
   a first rotation angle detector configured to detect a rotation angle of an input shaft of the reducer;
   a second rotation angle detector configured to detect a rotation angle of an output shaft of the reducer;
   an auxiliary power source configured to supply electricity to the first rotation angle detector in a state in which the robot control device is stopped; and
   a control unit configured to store and update a rotation angle, wherein
   the control unit includes a first rotation angle storage unit configured to store a first rotation angle detected by the first rotation angle detector, a second rotation angle storage unit configured to store a second rotation angle detected by the second rotation angle detector, and a rotation angle updating unit configured to update a rotation angle stored in the first rotation angle storage unit or the second rotation angle storage unit,
   supply of electricity to the second rotation angle detector is stopped in the state in which the robot control device is stopped,
   the second rotation angle storage unit is configured to store the second rotation angle at a time when the robot control device is stopped in the state in which the robot control device is stopped, and
   when the robot control device is started from the state in which the robot control device is stopped, the rotation angle updating unit calculates an error in number of rotations regarding the second rotation angle based on a difference between the first rotation angle stored in the first rotation angle storage unit when the robot control device is stopped and the first rotation angle detected by the first rotation angle detector when the robot control device is started and a difference between the second rotation angle stored in the second rotation angle storage unit when the robot control device is stopped and the second rotation angle detected by the second rotation angle detector when the robot control device is started, and updates the second rotation angle based on the error in the number of rotations.

2. The robot control device according to claim 1, wherein the control unit includes an update judgement unit configured to judge whether the second rotation angle stored in the second rotation angle storage unit needs to be updated, and the update judgement unit detects a difference between the first rotation angle and the second rotation angle during a period in which the robot is driven and prohibits update of the second rotation angle when the difference between the first rotation angle and the second rotation angle exceeds a predetermined judgement value.

3. The robot control device according to claim 1, wherein the control unit includes an abnormality detection unit configured to detect an abnormality in the first rotation angle detector and an update judgement unit configured to judge whether the second rotation angle stored in the second rotation angle storage unit needs to be updated, and the update judgement unit prohibits update of the second rotation angle when an abnormality is detected in the first rotation angle detector and determines to update the first rotation angle when the first rotation angle detector is recovered from the abnormality.

4. A robot control device for controlling a robot including a joint part driven by an output from a reducer for increasing rotational force of a driving motor, the robot control device comprising:
- a first rotation angle detector configured to detect a rotation angle of an input shaft of the reducer;
- a second rotation angle detector configured to detect a rotation angle of an output shaft of the reducer;
- an auxiliary power source configured to supply electricity to the first rotation angle detector in a state in which the robot control device is stopped; and
- a control unit configured to store and update a rotation angle, wherein the control unit includes a first rotation angle storage unit configured to store a first rotation angle detected by the first rotation angle detector, a second rotation angle storage unit configured to store a second rotation angle detected by the second rotation angle detector, and a rotation angle updating unit configured to update a rotation angle stored in the first rotation angle storage unit or the second rotation angle storage unit, supply of electricity to the second rotation angle detector is stopped in the state in which the robot control device is stopped, the second rotation angle storage unit is configured to store the second rotation angle at a time when the robot control device is stopped in the state in which the robot control device is stopped, and when the robot control device is started from the state in which the robot control device is stopped, the rotation angle updating unit calculates number of rotations regarding the first rotation angle at which the first rotation angle is closest to the second rotation angle based on a difference between the second rotation angle stored in the second rotation angle storage unit when the robot control device is stopped or the second rotation angle detected by the second rotation angle detector after the robot control device is started and the first rotation angle detected by the first rotation angle detector after the robot control device is started, and updates the first rotation angle based on calculated number of rotations.

* * * * *